United States Patent [19]

Rieder

[11] E Re. 30,885

[45] Reissued Mar. 23, 1982

[54] NOVEL DIAMIDE AND LUBRICANTS CONTAINING SAME

[75] Inventor: Walter E. Rieder, Arcadia, Calif.

[73] Assignee: Cincinnati Milacron Inc., Cincinnati, Ohio

[21] Appl. No.: 243,455

[22] Filed: Mar. 13, 1981

Related U.S. Patent Documents

Reissue of:

[64] Patent No.: 4,239,635
Issued: Dec. 16, 1980
Appl. No.: 47,285
Filed: Jun. 11, 1979

[51] Int. Cl.[3] ..... C10M 1/32

[52] U.S. Cl. ..... 252/34; 252/33.6; 252/49.3; 252/51.5 A; 562/451; 562/507

[58] Field of Search ..... 252/33.6, 34, 49.3, 252/51.5 A; 562/451, 507

[56] References Cited

U.S. PATENT DOCUMENTS

| | | | |
|---|---|---|---|
| 3,024,277 | 3/1962 | Hotten | 252/51.5 A X |
| 3,256,196 | 6/1966 | Eickemeyer et al. | 252/51.5 A |
| 3,676,344 | 7/1972 | Kuceski | 252/51.5 A X |
| 3,884,947 | 5/1975 | Badin et al. | 252/51.5 A X |
| 3,945,931 | 3/1976 | Bussi et al. | 252/33.6 X |
| 4,049,716 | 9/1977 | Collet | 252/51.5 A X |
| 4,098,704 | 7/1978 | Sandler | 252/8.6 |
| 4,107,061 | 8/1978 | Sturwold et al. | 252/51.5 A X |
| 4,144,035 | 3/1979 | Moss et al. | 252/392 X |
| 4,172,802 | 10/1979 | Rieder | 252/49.3 |

FOREIGN PATENT DOCUMENTS 2759028 8/1978 Fed. Rep. of Germany .

*Primary Examiner*—Andrew Metz
*Attorney, Agent, or Firm*—Donald Dunn

[57] ABSTRACT

Carboxylic acid terminated diamides and alkali metal, ammonium or amine salts thereof are provided which are derived from the reaction of organic polycarboxylic acids and polyoxyalkylene diamines. The diamides have lubricating properties and are especially useful in aqueous metal working fluids.

25 Claims, No Drawings

NOVEL DIAMIDE AND LUBRICANTS CONTAINING SAME

Matter enclosed in heavy brackets [ ] appears in the original patent but forms no part of this reissue specification; matter printed in italics indicates the additions made by reissue.

FIELD OF THE INVENTION

This invention relates to carboxylic acid terminated diamides and the alkali metal, ammonium or organic amine salts thereof. More particularly this invention relates to carboxylic acid terminated diamides and the alkali metal, ammonium or organic amine salts thereof wherein the diamide is obtained by the reaction of an organic polycarboxylic acid and a polyoxalkylene diamine. In certain of its aspects, this invention relates to lubricants and metal working fluids, particularly aqueous metal working fluids.

BACKGROUND

In the prior art, carboxylic acid terminated diamides have been described by G. F. D'Alelio (U.S. Pat. No. 3,483,105—Dec. 9, 1969) which were prepared from aliphatic or cycloaliphatic hydrocarbon diamines and then reacted with glycidyl acrylate to form radiation curable polymers. Carboxylic acid terminated diamides have also been described by J. Bernstein et al. (U.S. Pat. No. 3,541,141—Nov. 17, 1970), J. H. Ackerman (U.S. Pat. No. 3,542,861—Nov. 24, 1970 and U.S. Pat. No. 3,732,293—May 8, 1973), E. Felder et al. (U.S. Pat. No. 3,557,197—Jan. 19, 1971 and U.S. Pat. No. 3,654,272—Apr. 4, 1972) and G. Buttermann (U.S. Pat. No. 3,939,204—Feb. 17, 1976) which are prepared by reacting the amino group of an amino substituted benzoic acid, optionally having iodine or other substituents on the benzene ring, with a dicarboxylic acid or the acid chloride or acid bromide thereof and which are useful as radiopaque agents.

Customarily, metal working fluids, which may be aqueous or non-aqueous compositions, are used in such metal working methods as cutting, grinding, forming, rolling, forging, drilling, broaching and milling to increase tool life, increase production rates and achieve quality finished products. These metal working fluids, among other things, must provide a lubricating and cooling action in the working of the metal stock or part. Such lubricating and cooling action tends to decrease tool wear, thereby increasing tool life, aids in providing high quality surface finish and assists in achieving accurately finished parts. Additionally, the cooling and lubricating functions of metal working fluids increase metal removal rates and non chip forming metal processing rates. To achieve such benefits in metal working processes, the metal working fluids and the components thereof should exhibit stability under normal (e.g. room temperature storage) conditions and the physical, chemical and thermal conditions encountered in metal working processes. Additionally, the metal working fluid should not cause or promote corrosion of the metal workpiece and/or tool. Many of these properties of stability and corrosion prevention of metal working fluids also apply to lubricants useful in non-metal working situations such as in the lubrication of traveling contacting metallic surfaces to retard or prevent wearing thereof and to reduce the forces associated with moving such metal surfaces relative to each other.

However, lubricants and metal working fluids of the prior art have been found to lack or be seriously limited in one or more of these or other properties so as to restrict the usefulness of such lubricants and metal working fluids. Thus, the art constantly strives to overcome such deficiences and to fill the need for better lubricants and metal working fluids.

It is, therefore, an object of this invention to provide a novel carboxylic acid terminated diamide and the alkali metal, ammonium or organic amine salts thereof.

It is a further object of this invention to provide a stable effective lubricant.

A still further object of this invention is to provide metal working fluids comprising a carboxylic acid terminated diamide or the alkali metal, ammonium or organic amine salts thereof.

These objects and others will become apparent from the following more detailed description of this invention.

SUMMARY OF INVENTION

There is provided in accordance with this invention (1) a carboxylic acid group terminated polyoxyalkylene diamide and the alkali metal, ammonium and organic amine salts of said diamide and (2) metal working compositions comprising a carboxylic acid group terminated polyoxyalkylene diamide or the alkali metal, ammonium or organic amine salts of said diamide.

DESCRIPTION OF THE INVENTION

There has now been found, in accordance with this invention novel carboxylic acid group terminated polyoxyalkylene diamides and the alkali metal, ammonium and organic amine salts thereof. Further, there has been discovered useful, effective metal working compositions comprising a compound or mixture of compounds selected from the group consisting of (1) carboxylic acid group terminated polyoxyalkylene diamide, (2) the alkali metal salt of said diamide, (3) ammonium salt of said diamide and (4) the organic amine salt of said diamide. In accordance with this invention there is now provided a carboxylic acid terminated polyoxyalkylene diamide having at least one terminal carboxylic acid group per molecule or the alkali metal, ammonium or organic amine salt thereof and a metal working composition comprising said carboxylic acid terminated polyoxyalkylene diamide or the alkali metal, ammonium or organic amine salt thereof. This invention further provides a carboxylic acid terminated polyoxyalkylene diamide having at least 2 terminal carboxylic acid groups per molecule or the alkali metal, ammonium or organic amine salt thereof and a metal working composition comprising a carboxylic acid terminated polyoxyalkylene diamide having at least 2 terminal carboxylic acid groups per molecule or the alkali metal, ammonium or organic amine salt thereof. This invention also provides a carboxylic acid terminated polyoxyalkylene diamide having from 2 to 4 terminal carboxylic acid groups per molecule or the alkali metal, ammonium or organic amine salt thereof and a metal working composition comprising a carboxylic acid terminated polyoxyalkylene diamide having from 2 to 4 terminal carboxylic acid groups per molecule of the alkali metal, ammonium or organic amine salt thereof. Additionally, in accordance with this invention, there is provided a carboxylic acid terminated polyoxyalkylene diamide having 2 terminal carboxylic acid groups per molecule or the alkali metal, ammonium or organic amine salt thereof and a metal working composition comprising a carboxylic acid terminated polyoxyalkylene diamide having 2 terminal carboxylic acid groups per molecule or the alkali metal, ammonium or organic amine salt thereof. Mixtures of carboxylic acid terminated polyoxyalkylene diamides or the alkali metal, or ammonium or organic amine salts thereof according to this invention may be used in the metal working compositions according to this invention. There may be used in the metal working compositions according to this invention a mixture of (1) the carboxylic acid terminated polyoxyalkylene diamide and (2) the alkali metal, ammonium or organic amine salt thereof according to this invention.

The carboxylic acid terminated polyoxyalkylene diamide or the alkali metal, ammonium or organic amine salt according to this invention is useful as a lubricant for metals and plastics thereby to reduce or inhibit the deleterious effects of friction on such materials. Metal working compositions in accordance with this invention are useful in the working of metals by chip forming and non-chip forming metal working processes as are well known in the art. The metal working composition of this invention advantageously can be used in such chip forming and non-chip forming metal working process as milling, turning, drilling, grinding, deep drawing, drawing and ironing, reaming, tapping, punching and spinning. Increased tool ife, lower working forces, reduced heat build up and improved surface finish are a few of the advantages realized by the use of the metal working compositions of this invention in metal working processes. A still further and particularly significant advantage of the metal working compositions of this invention lies in the high stability of the compositions. The metal working compositions of this invention and particularly the carboxyl terminated diamide and salts thereof are resistant to break down especially upon storage for prolonged periods. This resistance to break down is present in the metal working compositions of this invention which have not been used in a metal working process but simply stored awaiting such use, as well as the metal working compositions of this invention which have been intermittently stored for short intervals, e.g. overnight, upon being used in metal working processes. The resistance to break down exhibited by the metal working compositions of this invention, particularly the carboxyl terminated diamide and salts thereof, prolongs their effective and useful life in metal working processes. Such prolonged effective and useful life of the metal working compositions of this invention translates to economics in the metal working processes (e.g. less down time and lower metal working fluid consumption), because of their high precipitation and separation resistance.

Advantageously the carboxylic acid group terminated polyoxyalkylene diamide and the alkali metal, ammonium or organic amine salt thereof according to this invention exhibit high lubricity, are highly dispersible or soluble in aqueous media, can have corrosion inhibiting activity and show high stability in aqueous media.

In connection with the uses of the carboxylic acid terminated polyoxyalkylene diamide or alkali metal or ammonium or organic amine salt thereof according to this invention and the metal working composition of this invention, it has been found that the carboxylic acid terminated polyoxyalkylene diamide or alkali metal, ammonium or organic amine salt thereof and the metal working composition importantly and advantageously exhibit high lubricity, high stability and corrosion inhibiting action.

The carboxylic acid terminated polyoxyalkylene diamide and the alkali metal, ammonium and organic amine salts thereof, according to this invention, may be described by the following general formula

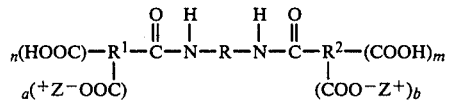

wherein R is the divalent radical residue of am amine terminated polyoxyalkylene homopolymer or copolymer diamine absent the terminal amine groups, $R^1$ and $R^2$ are the same or different and are selected from aliphatic, aromatic, cycloaliphatic, aryl aliphatic, alkyl aromatic, thiodialiphatic, halogen substituted aliphatic or halogen substituted aromatic radicals having a free valence of a+n+1 and b+m+1 respectively, n is 0 to 3, m is 0 to 3, Z is organic amine cation, ammonium ion or alkali metal ion, a is 0 to 3, b is 0 to 3, a+n is 0 to 3, b+m is 0 to 3 and a+b+m+n is 1 to 6. In a particular aspect of this invention the above general formula and the definitions pertaining thereto may be substituted for the described carboxylic acid group terminated diamide and alkali metal, ammonium or organic amine salt thereof of this invention. In another particular aspect according to this invention, there is provided a metal working composition comprising a carboxylic acid group terminated diamide or the alkali metal, ammonium or organic amine salt thereof, preferably sodium or potassium salts or alkanol amine salts, in accordance with the above general formula.

As a preferred embodiment of (1) the carboxylic acid group terminated polyoxyalkylene diamide or alkali metal, ammonium or organic amine salts thereof and (2) the metal working composition comprising said diamide or alkali metal, ammonium or organic amine salts thereof in accordance with this invention, the $R^1$ and $R^2$ groups of the above general formula, for the carboxylic acid group terminated diamide and ammonium salts, organic amine salts or alkali metal salts thereof, are the same or different hydrocarbon radicals selected from aliphatic, $C_6$ aromatic, cycloaliphatic, aryl aliphatic having 6 carbons in the aryl group, alkyl $C_6$ aromatic, halogen substituted aliphatic or halogen substituted $C_6$ aromatic hydrocarbon radicals and having a free valence of a+n+1 and b+m+1 respectively. In another preferred embodiment of (1) the carboxylic acid group terminated polyoxyalkylene diamide or alkali metal, ammonium or organic amine salts thereof and (2) the metal working composition comprising said diamide or alkali metal, ammonium or organic amine salts thereof in accordance with this invention, wherein the carboxylic acid terminated diamide and the ammonium salts, organic salts or alkali metal salts thereof are according to the above general formula, $R^1$ and $R^2$ are the same or different saturated or unsaturated, branched or unbranched aliphatic hydrocarbon radicals having from 2 to 20 carbon atoms. Among other preferred embodiments of (1) the carboxylic acid group terminated polyoxyalkylene diamide or alkali metal, ammonium or organic amine salt thereof and (2) the metal working composition comprising said diamide or alkali metal, ammonium or organic amine salt thereof in accordance with this invention wherein the carboxylic acid group terminated diamide and the ammonium, organic amine or alkali metal salt thereof are according to the above general formula include wherein (1) $R^1$ and $R^2$ are the same or different thio di-aliphatic hydrocarbon radicals, (2) $R^1$ and $R^2$ are the same different monocyclic aromatic hydrocarbon radicals having 6 carbon atoms, optionally halogen substituted, (3) $R^1$ and $R^2$ are the same or different aryl aliphatic hydrocarbon radicals wherein the aryl group is a monocyclic aryl group having six carbon atoms, (4) $R^1$ and $R^2$ are the same or different alkyl aromatic hydrocarbon radicals wherein the aromatic group is a monocyclic aromatic group having six carbon atoms, (5) $R^1$ and $R^2$ are cycloaliphatic hydrocarbon radicals having six carbon atoms in the cycloaliphatic ring, and (6) n is 1 to 3, or a is 1 to 3, m is 1 to 3 or b is 1 to 3 and $a+b+m+n$ is 2 to 6. Preferably the (1) organic amine salt of the carboxylic acid group terminated diamide and (2) metal working composition comprising the organic amine salt of the carboxylic acid group terminated diamide of this invention according to the above general formula are alkanol amine salts more preferably alkanol amine salts having 1 to 3 alkanol groups containing from 2 to 6 carbon atoms in each alkanol group. The alkali metal salts of the carboxylic acid group terminated diamide according to the above general formula are preferably the sodium or potassium salts.

In accordance with the above general formula for the carboxylic acid group terminated diamide of this invention, as well as the ammonium salts, organic amine salts or alkali metal salts of said diamide, R preferably is the amine free residue of an amine terminated polyoxyalkylene homopolymer or copolymer diamine in which the oxyalkylene group of the homopolymer or copolymer diamine is a branched or unbranched oxyalkylene group having 2 to 4 carbon atoms, and is described by the formula $$[-O-\underset{}{\overset{R^3}{\overset{|}{C}}}H-(CH_2)_x-\overset{R^4}{\overset{|}{C}}H-]$$

where x is 0, 1 or 2, $R^3$ is hydrogen, methyl or ethyl and $R^4$ is hydrogen or methyl provided that only one of $R^3$ and $R^4$ can be methyl when x is 1 or 2 and when $R^3$ is ethyl x must be 0 and $R^4$ must be hydrogen.

The amine group terminated polyoxyalkylene homopolymers and copolymers that may be used to prepare the carboxylic acid group terminated diamide of this invention, for example include but are not limited to polyoxyethylene diamine, polyoxypropylene diamine, polyoxybutylene diamine, polyoxypropylene/polyoxyethylene/polyoxpropylene block copolymer diamine, polyoxybutylene/polyoxethylene/polyoxybutylene block copolymer diamine, polyoxybutylene/polyoxypropylene/polyoxybutylene block copolymer diamine and polyoxypropylene/polyoxybutylene/polyoxypropylene block copolymer diamine. The polyoxybutylene may contain 1,2, oxybutylene, 2,3, oxybutylene or 1,4 oxybutylene units. In respect to the polyoxyalkylene copolymer diamine the copolymer may be a block or a random copolymer. The length of the polyoxyalkylene blocks, i.e. the number of oxyalkylene groups in the block, may vary widely. Thus, in accordance with this invention, the terminal polyoxyalkylene blocks may be polyoxyethylene, polyoxypropylene or polyoxybutylene blocks. These terminal polyoxyethylene, polyoxypropylene or polyoxybutylene blocks may contain as few as 2 oxyethylene units, 2 oxypropylene units or 2 oxybutylene units respectively or there may be present from 3 to 20 oxyethylene, oxypropylene or oxybutylene units. The molecular weight of the polyoxyalkylene diamine used to prepare the carboxylic acid group terminated diamide may vary over a wide range. Thus, there may be used polyoxyalkylene diamine whose average molecular weight may vary from about 150 to 4000, preferably from about 300 to 2000. It is also preferred to use liquid polyoxyalkylene diamines.

$R^1$ and $R^2$ in accordance with the above general formula for the carboxylic acid terminated diamide and salt thereof of this invention are the carboxylic acid group free residue of a monocarboxylic, dicarboxylic, or tetracarboxylic acid or the corresponding acid halide or anhydride thereof. As examples of dicarboxylic acids and tricarboxylic acids usable in the preparation of the carboxylic acid group terminated diamide there includes, but not limited to succinic, isosuccinic, chlorosuccinic, glutaric, pyrotartaric, adipic, chloroadipic, pimelic, suberic, chlorosuberic, azelaic, sebacic, brassylic, octadecanediotic, thapsic, eicosanedioic, maleic, fumaric, citriconic, mesaconic, tricarballylic, aconitic, 1,2-benzene dicarboxylic, 1,3-benzene dicarboxylic, 1,4-benzene dicarboxylic, tetrachlorophthalic, tetrahydrophthalic, chlorendic, hemimellitic, trimellitic, trimesic, 2-chloro-1,3,5-benzene tricarboxylic, hexahydrophthalic, hexahydroisophthalic, hexahydroterephthalic, phenyl succinic, 2-phenyl pentanedioic, thiodipropionic acids, carboxylic acid products of the dimerization and polymerization of $C_8$ to $C_{26}$ monomeric unsaturated fatty acids such as described in U.S. Pat. No. 2,482,760 (C. C. Goebel—Sept. 27, 1949), U.S. Pat. No. 2,482,761 (C. C. Goebel—Sept. 27, 1949), U.S. Pat. No. 2,731,481 (S. A. Harrison—Jan. 17, 1956), U.S. Pat. No. 2,793,219 (F. O. Barrett et al.—May 21, 1957), U.S. Pat. No. 2,964,545 (S. A. Harrison—Dec. 13, 1960), U.S. Pat. No. 2,978,468 (B. L. Hampton—Apr. 4, 1961), U.S. Pat. No. 3,157,681 (E. M. Fisher—Nov. 17, 1964) and U.S. Pat. No. 3,256,304 (C. M. Fisher et al.—June 1966), the carboxylic acid products of the Diels Alder type reaction of an unsaturated fatty acid with $\alpha,\beta$-ethylenically unsaturated carboxy acid (e.g. arcylic, methacrylic, maleic or fumaric acids) such as are taught in U.S. Pat. No. 2,444,328 (C. M. Blair, Jr.—June 29, 1948), the disclosure of which is incorporated herein by reference, and the Diels Alder adduct of a three to four carbon atom $\alpha,\beta$-ethylenically unsaturated alkyl monocarboxylic or dicarboxylic acid (e.g. acrylic and fumaric acids respectively) and pimeric or abietic acids. Examples of the dimerized and polymerized $C_8$ to $C_{26}$ monomeric unsaturated fatty acids include but are not limited to such products as Empol ® 1014 Dimer Acid, Empol ® 1016 Dimer Acid and Empol ® 1040 Trimer Acid each available from Emery Industries, Inc. As examples of the carboxylic acid product of a Diels Alder type reaction there may be cited the commercially available Westvaco ® Diacid 1525 and Westvaco ® Diacid 1550, both being available from the Westvaco Corporation. In place of the dicarboxylic acid or tricarboxylic acid there may be used the corresponding anhydride or acid halide, where the acid admits of the formation of the anhydride and acid halide, e.g. acid chloride, in preparing the carboxylic acid terminated diamide. Where there is used the corresponding acid halide of the dicarboxylic and tricarboxylic acid to prepare the carboxylic acid group terminated diamide it is, of course, necessary to convert the terminal acid halide groups of the acid halide terminated diamide product, resulting from the reaction of the acid halide with the amine group terminated polyoxyalkylene homopolymer or copolymer diamine to the corresponding carboxylic acid groups. Such conversion of the terminal acid halide groups to carboxylic acid groups may be accompanied by methods well known in the art. Examples of monocarboxylic acids include but are not limited to acetic, propionic, butyric, isobutyric, 2-ethyl hexanoic, octanoic, dodecanoic, eicosoic, behenic, acrylic, methacrylic, octadecanoic, oleic, linoleic, linolenic, β-eleostearic, benzoic, phenyl-ethanoic, phenyl-propionic, 4-methyl-benzoic, 2-methyl-benzoic, 2-ethyl-benzoic, 3-ethyl-benzoic, 4-ethyl-benzoic, 2,4-dimethyl-benzoic, 2,6-dimethyl-benzoic, 3,4-dimethyl-benzoic, 3,5-dimethyl-benzoic, 2-tertiary butyl-benzoic, 4-tertiary butyl-benzoic, 2-bromo-benzoic, 3-bromo-benzoic, 4-bromo-benzoic, 2-chloro-benzoic, 4-chloro-benzoic, 2-bromo-3-chloro-benzoic, 2,6-dibromo-benzoic, 2,3-dibromo-benzoic, 2,3-dichloro-benzoic, 2,6-dichlorobenzoic, 4-fluoro benzoic, 4-iodo benzoic, hexahydrobenzoic, 2-chloro-propenoic, 3-chloro-propenoic, 2,3-dichloro-propenoic, 3-chloro-propanoic, 3-bromo-propanoic, 2,3-dichloro-propanoic, 2-bromo-octanoic, 8-fluoro octanoic and 9,10-dibromo-octadecanoic acids.

As the organic amine salt of the carboxylic acid group terminated diamide and metal working composition comprising same according to this invention there may be used the alkyl primary amine, alkyl secondary amine, alkyl tertiary amine and preferably the monalkanol amine, dialkanol amine and trialkanol amine salt. Alkyl primary, secondary and tertiary amine salts of the carboxylic acid group terminated diamide, having from 2 to 8 carbon atoms in the alkyl group of the amine, may be used in the practice of this invention. It is, however, preferred to use the monoalkanol amine, dialkanol amine and trialkanol amine salts of the carboxylic acid group terminated diamide, wherein the alkanol group contains from 2 to 8 carbon atoms and may be branched or unbranched, in the practice of this invention. The use of the monoalkanol amine and trialkanol amine salts of the carboxylic acid group terminated diamide, wherein the alkanol group has from 2 to 8 carbon atoms, is still more preferred in the practice of this invention. Organic amines which may be used to form the amine salts of the carboxylic acid group terminated diamide and metal working composition comprising same according to this invention also include $C_2$ to $C_6$ alkylene diamines, poly($C_2$ to $C_4$oxyalkylene) diamines having a molecular weight of from about 200 to about 900, N—$C_1$ to $C_8$ alkyl ($C_2$ to $C_6$ alkylene) diamine, N,N'-di $C_1$ to $C_8$ alkyl($C_2$ to $C_6$ alkylene) diamine, N,N,N'-tri $C_1$ to $C_8$ alkyl($C_2$ to $C_6$ alkylene)diamine, N,N,N',N'-tetra $C_1$ to $C_8$ alkyl ($C_2$ to $C_6$ alkylene) diamine, N-alkanol ($C_2$ to $C_6$alkylene) diamine, N,N'-dialkanol($C_2$ to $C_6$ alkylene) diamine, N,N,N'-trialkanol ($C_2$ to $C_6$ alkylene) diamine, N,N,N',N'-tetraalkanol ($C_2$ to $C_6$ alkylene) diamine and $CH_3CH_2O\ (CH_2CH_2O)_nCH_2CH_2CH_2NH_2$ wherein n is 1 or 2. Alkyl alkanol amines having from 2 to 8 carbon atoms in the alkyl and alkanol groups may also be used as the organic amine in the practice of this invention.

Examples of alkyl amines, which may be used to form the alkyl amine salts of the carboxylic acid group terminated diamide in the practice of this invention, include but are not limited to ethyl amine, butyl amine, propyl amine, isopropyl amine, secondary butyl amine, tertiary butyl amine, hexyl amine, isohexyl amine, n-octyl amine, 2-ethyl hexyl amine, diethyl amine, dipropyl amine, diisopropyl amine, dibutyl amine, ditertiary butyl amine, dihexyl amine, di n-octyl amine, di 2-ethyl hexyl amine, triethyl amine, tripropyl amine, triisopropyl amine, tributyl amine, tri secondary butyl amine, trihexyl amine, tri n-octyl amine and tri 2-ethyl hexyl amine. As examples of alkanol amines, which may be used to make the alkanol amine salts of the carboxylic acid group terminated diamide in the practice of this invention, there include, but not limited to, monoethanol amine, monobutanol amine, monopropanol amine, monoisopropanol amine, monoisobutanol amine, monohexanol amine, monooctanol amine, diethanol amine, dipropanol amine, diisopropanol amine, dibutanol amine, dihexanol amine, diisohexanol amine, dioctanol amine, triethanol amine, tripropanol amine, triisopropanol amine, tributanol amine, triisobutanol amine, trihexanol amine, triisohexanol amine, trioctanol amine triisooctanol amine.

Polyoxyalkylene diamines usable in the salts according to the practice of this invention include for example polyoxyethylene diamines and polyoxypropylene diamines having molecular weights of from about 200 to about 900. There may also be used in the practice of this invention amines such as methoxypropylamine, dimethyl aminopropyl amine, 1,3-propylene diamine, ethylene diamine, 3(B 2-ethoxyethoxy)propyl amine, N,N,N',N'-tetramethyl-1,3-butane diamine, mono ethanol ethylene diamine, N,N'-diethanol ethylene diamine, N,N,N'-tri hydroxymethyl ethylene diamine, N,N-diethyl ethanol amine and N-ethyl diethanol amine.

In the practice of this invention the carboxylic acid group terminated diamide according to the previously described general formula may be prepared in accordance with conventional methods well known in the art such as, for example, by reacting 2 moles of a dicarboxylic acid or tricarboxylic acid or mixtures of dicarboxylic acids and tricarboxylic acids with 1 mole of a polyoxyalkylene homopolymer or copolymer diamine. Alternatively there may be reacted one mole of a monocarboxylic acid and one mole of a dicarboxylic or tricarboxylic acid with one mole of a polyoxyalkylene diamine. Where desired a slight excess of the total carboxylic acid (e.g. 2.05 to 2.1 moles of the carboxylic acid per mole of polyoxyalkylene diamine may be combined with the polyoxyalkaylene diamine to form the carboxylic acid terminated diamide of this invention. The reaction may be carried out at reduced or elevated temperatures, optionally in the presence of a solvent medium and/or an inert atmosphere. Sub or super atmospheric pressure may be used. In preparing the carboxylic acid terminated diamide of this invention, it is well known that there may be substituted for the monocarboxylic acid the corresponding acid halide, for the dicarboxylic acid the corresponding acid halide or anhydride and for the tricarboxylic acid the corresponding acid halide. When the acid halide is employed and the resulting diamide has terminal acid halide groups such acid halide groups may be converted to carboxylic acid groups by methods well known in the art.

The organic amine salt of the carboxylic acid group terminated diamide may be prepared by methods well known in the art such as, for example, by simply adding the organic amine to the carboxylic acid group terminated diamide in the presence of an aqueous medium or conversely adding the carboxylic acid group terminated diamide to the organic amine in the presence of an aqueous medium. In an alternative method, the aqueous medium may be omitted.

As alkali metal salts of the carboxylic acid group terminated diamide of this invention there are included the lithium, sodium, potassium, rubidium and cesium salts. The lithium, sodium and potassium, salts are, however, preferred. Formation of the alkali metal salts of the carboxylic acid group terminated diamide may be accomplished by methods well known in the art such as, for example, by adding the carboxylic acid group terminated diamide to the hydroxide of the alkali metal in the presence of an aqueous medium.

In accordance with this invention there is provided a metal working composition comprising a carboxylic acid group terminated polyoxyalkylene diamide or the alkali metal, ammonium or organic amine salt of said diamide. Further, there is provided in accordance with this invention a metal working composition comprising a carboxylic acid group terminated polyoxyalkylene diamide according to the general formula herein before described. As one embodiment of the metal working composition of this invention there may be a metal working composition comprising water and the carboxylic acid group terminated polyoxyalkylene diamide or the alkali metal (preferably sodium or potassium) or organic amine (preferably alkanol amine) salt of said diamide. In another embodiment of the metal working composition of this invention, there is provided a metal working composition comprising an oil and the carboxylic acid group terminated polyoxyalkylene diamide or the alkali metal, ammonium or organic amine salt of said diamide. A further embodiment of the metal working composition of this invention comprises water, oil and the carboxylic acid group terminated polyoxyalkylene diamide or the alkali metal, ammonium or organic amine salt of said diamide. The carboxylic acid group terminated polyoxyalkylene diamide and the alkali metal, ammonium or organic amine salts of said diamide of the above embodiments of the metal working compositions of this invention is the carboxylic acid group terminated polyoxyalkylene diamide and alkali metal ammonium or organic amine salts of said diamide as previously described herein. As the oil there may be used for example synthetic oils, petroleum oils, vegetable oils, animal oils or soluble oils well known in the art. The carboxylic acid group terminated polyoxyalkylene diamide or the ammonium, alkali metal or organic amine salt thereof described herein, particularly the liquid members of said diamides and salts, may, in the absence of oil and/or water, be used as a metal working composition in a metal working method such as, for example, tapping.

There may be added to the metal working composition of this invention, in conventional amounts well known in the art, various additives such as corrosion inhibitors, biocides, fungicides, bacteriocides, surfactants, extreme pressure agents and antioxidants well known in the art.

Conventional methods and apparatus well known in the art may be used to make the metal working composition of this invention. Thus, for example, in accordance with such methods and apparatus (1) oil or water may be added to the carboxylic acid group terminated polyoxyalkylene diamide or the ammonium, alkali metal or organic amine salt thereof, (2) the carboxylic acid group terminated polyoxyalkylene diamide or the alkali metal, ammonium or organic amine salt thereof may be added to water or oil, (3) organic amine, ammonium hydroxide or alkali metal hydroxide may be added to water followed by the carboxylic acid group terminated diamide or (4) the carboxylic acid group terminated polyoxyalkylene diamide may be added to water followed by the addition or organic amine, ammonium hydroxide or alkali metal hydroxide.

In the metal working composition according to this invention the concentration of the carboxylic acid group terminated polyoxyalkylene diamide or the alkali metal, ammonium or organic amine salt thereof may vary over a wide range. Thus, for example, the carboxylic acid group terminated polyoxyalkylene diamide or the alkali metal, ammonium or organic amine salt thereof may constitute 100% by weight of the metal working composition or, for example, may be present in the metal working composition in an amount of from 0.01% to 99%, preferably 0.01% to 25%, more preferably 0.03% to 5% by weight based on the total weight of the metal working composition.

This invention, which has been described above with respect to various embodiments thereof, is further described in the following non-limiting examples wherein all amounts and percentages are by weight unless otherwise indicated.

In the following examples:

(a) Jeffamine® D230 is a primary amine terminated polyoxypropylene diamine having an average molecular weight of about 230 and available from the Jefferson Chemical Company, Inc.

(b) Jeffamine® D400 is a primary amine terminated polyoxypropylene diamine having an average molecular weight of about 400 and available from the Jefferson Chemical Company, Inc.

(c) Jeffamine® D2000 is a primary amine terminated polyoxypropylene diamine having an average molecular weight of about 2000 and available from the Jefferson Chemical Company, Inc.

(d) Jeffamine® ED 600 is a diamine having an average molecular weight of about 600 available from the Jefferson Chemical Company, Inc. and being a primary amine terminated propylene oxide capped polyoxyethylene.

(e) Jeffamine® ED900 is a diamine having an average molecular weight of about 900 available from the Jefferson Chemical Company, Inc. and being a primary amine terminated propylene oxide capped polyoxyethylene.

(f) Jeffamine® ED 2001 is a diamine having an average molecular weight of about 2000 available from the Jefferson Chemical Company, Inc. and being a primary amine terminated propylene oxide capped polyoxyethylene.

(g) Dow® XA 1332 is a diamine obtained from the Dow Chemical Company and is a primary amine terminated propylene oxide capped 400 molecular weight polyoxyethylene.

(h) Dow® XA 1333 is a diamine obtained from the Dow Chemical Company and is a primary amine terminated propylene oxide capped 600 molecular weight polyoxyethylene.

Jeffamine is a registered trademark of the Jefferson Chemical Company, Inc. and Dow is a registered trademark of the Dow Chemical Company.

EXAMPLE 1

Azelaic acid and Jeffamine® D400 at a mole ratio of 2:1 (azelaic acid to Jeffamine® D400) were reacted together in a toluene medium, under nitrogen, at a temperature in the range of 110° to 187° C. and the water of reaction continuously removed. After completion of the reaction a viscous liquid carboxylic acid group terminated diamide product was isolated from the toluene.

EXAMPLES 2 TO 37

In a manner essentially the same as in Example 1, the following acids and diamines were reacted at a 2:1 mole ratio of acid to diamine to produce a carboxylic acid terminated diamide product in accordance with this invention.

| Example No. | Acid | Diamine |
|---|---|---|
| 2 | azelaic acid | Jeffamine ® D230 |
| 3 | azelaic acid | Jeffamine ® D400 |
| 4 | azelaic acid | Jeffamine ® D2000 |
| 5 | azelaic acid | Jeffamine ® ED600 |
| 6 | azelaic acid | Jeffamine ® ED900 |
| 7 | azelaic acid | Jeffamine ® ED2001 |
| 8 | azelaic acid | Dow ® XA1332 |
| 9 | azelaic acid | Dow ® XA1333 |
| 10 | adipic acid | Jeffamine ® D230 |
| 11 | adipic acid | Jeffamine ® D400 |
| 12 | adipic acid | Jeffamine ® ED600 |
| 13 | adipic acid | Jeffamine ® ED900 |
| 14 | adipic acid | Dow ® XA1332 |
| 15 | adipic acid | Dow ® XA1333 |
| 16 | suberic acid | Jeffamine ® D230 |
| 17 | suberic acid | Jeffamine ® D400 |
| 18 | 1,8/1,9 hexadecane dicarboxylic acid | Jeffamine ® D400 |
| 19 | 3,3″-thiodipropionic acid | Jeffamine ® D400 |
| 20 | maleic anhydride | Jeffamine ® ED600 |

-continued

| Example No. | Acid | Diamine |
|---|---|---|
| 21 | cyclohexane dicarboxylic anhydride | Jeffamine ® ED900 |
| 22 | cyclohexene dicarboxylic anhydride | Jeffamine ® D400 |
| 23 | p-phenylene diacetic acid | Jeffamine ® D400 |
| 24 | phthalic anhydride | Jeffamine ® ED900 |
| 25 | 2,5-pyridene dicarboxylic acid | Jeffamine ® D230 |
| 26 | Dimer Acid 1014* | Jeffamine ® D400 |
| 27 | Dimer Acid 1014* | Dow ® XA1332 |
| 28 | Dimer Acid 1014* | Dow ® XA1333 |
| 29 | Diacid 1525** | Jeffamine ® D400 |
| 30 | Diacid 1550*** | Jeffamine ® D400 |
| 31 | adipic acid | Jeffamine ® D2000 |
| 32 | pimelic acid | Jeffamine ® D400 |
| 33 | succinic acid | Jeffamine ® D400 |
| 34 | sebacic acid | Jeffamine ® D400 |
| 35 | dodecanedioic acid | Jeffamine ® D400 |
| 36 | glutaric acid | Jeffamine ® D400 |
| 37 | 3,3′-thiodipropionic acid | Jeffamine ® D230 |

*Dimer Acid 1014 is Empol ® 1014 a polymerized fatty acid having a typical composition of 95% dimer acid ($C_{36}$ dibasic acid) approx. mol. wt. 565.4% trimer acid ($C_{54}$ tribasic acid) approx. mol. wt. 845 and 1% monobasic acid ($C_{18}$ fatty acid) approx. mol. wt. 282 available from Emery Industries Inc.

**Diacid 1525 is Westvaco ® Diacid 1525 a Diels Alder reaction product of tall oil and acrylic acid and available from the Westvaco Corp.

***Diacid 1550 is Westvaco ® Diacid 1550 A Diels Alder reaction product of tall oil and acrylic acid, said product refined to contain about 10% mono acids and available from the Westvaco Corp.

EXAMPLES 38 TO 114

The following examples illustrate various formulations according to this invention that were prepared in 500 gram amounts.

| Example No. | Diamide of | Weight (gms) of Diamide | Water | KOH | NaOH | $NH_4OH$ | TEA* | MIA** |
|---|---|---|---|---|---|---|---|---|
| 38 | Example 1 | 0.6 | 498.8 | | | | 0.6 | |
| 39 | Example 1 | 1.5 | 497.0 | | | | 1.5 | |
| 40 | Example 1 | 6.0 | 488.0 | | | | 6.0 | |
| 41 | Example 1 | 15.0 | 470.0 | | | | 15.0 | |
| 42 | Example 1 | 60.0 | 380.0 | | | | 60.0 | |
| 43 | Example 1 | 150.0 | 200.0 | | | | 150.0 | |
| 44 | Example 2 | 15.0 | 481.5 | | | 3.5 | | |
| 45 | Example 2 | 15.0 | 470.0 | | | | 15.0 | |
| 46 | Example 3 | 15.0 | 481.0 | | 4.0 | | | |
| 47 | Example 3 | 15.0 | 479.4 | 5.6 | | | | |
| 48 | Example 3 | 15.0 | 481.5 | | | 3.5 | | |
| 49 | Example 3 | 15.0 | 470.0 | | | | 15.0 | |
| 50 | Example 3 | 15.0 | 477.5 | | | | | 7.5 |
| 51 | Example 4 | 15.0 | 479.4 | 5.6 | | | | |
| 52 | Example 4 | 15.0 | 470.0 | | | | 15.0 | |
| 53 | Example 5 | 15.0 | 470.0 | | | | 15.0 | |
| 54 | Example 5 | 15.0 | 477.5 | | | | | 7.5 |
| 55 | Example 6 | 15.0 | 470.0 | | | | 15.0 | |
| 56 | Example 7 | 15.0 | 470.0 | | | | 15.0 | |
| 57 | Example 7 | 15.0 | 477.5 | | | | | 7.5 |
| 58 | Example 8 | 15.0 | 479.4 | 5.6 | | | | |
| 59 | Example 8 | 15.0 | 470.0 | | | | 15.0 | |
| 60 | Example 9 | 15.0 | 470.0 | | | | 15.0 | |
| 61 | Example 9 | 15.0 | 481.5 | | | 3.5 | | |
| 62 | Example 10 | 15.0 | 481.0 | | 4.0 | | | |
| 63 | Example 10 | 15.0 | 470.0 | | | | 15.0 | |
| 64 | Example 11 | 15.0 | 470.0 | | | | 15.0 | |
| 65 | Example 12 | 15.0 | 485.0 | | | | | |
| 66 | Example 12 | 15.0 | 470.0 | | | | 15.0 | |
| 67 | Example 13 | 15.0 | 470.0 | | | | 15.0 | |
| 68 | Example 13 | 15.0 | 481.5 | | | 3.5 | | |
| 69 | Example 14 | 15.0 | 470.0 | | | | 15.0 | |
| 70 | Example 14 | 15.0 | 477.5 | | | | | 7.5 |
| 71 | Example 15 | 15.0 | 481.5 | | | 3.5 | | |
| 72 | Example 15 | 15.0 | 470.0 | | | | 15.0 | |
| 73 | Example 16 | 15.0 | 470.0 | | | | 15.0 | |
| 74 | Example 1 | 15.0 | 481.0 | | 4.0 | | | |
| 75 | Example 17 | 15.0 | 470.0 | | | | 15.0 | |
| 76 | Example 18 | 15.0 | 481.0 | | 4.0 | | | |
| 77 | Example 18 | 15.0 | 470.0 | | | | 15.0 | |

-continued

| Example No. | Diamide of | Weight (gms) of Diamide | Water | KOH | NaOH | $NH_4OH$ | TEA* | MIA** |
|---|---|---|---|---|---|---|---|---|
| 78 | Example 37 | 15.0 | 481.0 | | 4.0 | | | |
| 79 | Example 37 | 15.0 | 470.0 | | | | 15.0 | |
| 80 | Example 19 | 15.0 | 481.5 | | | 3.5 | | |
| 81 | Example 19 | 15.0 | 470.0 | | | | 15.0 | |
| 82 | Example 20 | 15.0 | 481.0 | | 4.0 | | | |
| 83 | Example 20 | 15.0 | 470.0 | | | | 15.0 | |
| 84 | Example 21 | 15.0 | 470.0 | | | | 15.0 | |
| 85 | Example 21 | 15.0 | 485.0 | | | | | |
| 86 | Example 21 | 15.0 | 481.0 | | 4.0 | | | |
| 87 | Example 22 | 15.0 | 481.0 | | 4.0 | | | |
| 88 | Example 23 | 15.0 | 470.0 | | | | 15.0 | |
| 89 | Example 23 | 15.0 | 481.0 | | 4.0 | | | |
| 90 | Example 24 | 15.0 | 485.0 | | | | | |
| 91 | Example 24 | 15.0 | 470.0 | | | | 15.0 | |
| 92 | Example 24 | 15.0 | 477.5 | | | | | 7.5 |
| 93 | Example 25 | 15.0 | 479.4 | 5.6 | | | | |
| 94 | Example 25 | 15.0 | 470.0 | | | | 15.0 | |
| 95 | Example 26 | 15.0 | 479.4 | 5.6 | | | | |
| 96 | Example 26 | 15.0 | 470.0 | | | | 15.0 | |
| 97 | Example 27 | 15.0 | 470.0 | | | | 15.0 | |
| 98 | Example 28 | 15.0 | 470.0 | | | | 15.0 | |
| 99 | Example 29 | 15.0 | 481.5 | | | 3.5 | | |
| 100 | Example 29 | 15.0 | 470.0 | | | | 15.0 | |
| 101 | Example 30 | 15.0 | 479.4 | 5.6 | | | | |
| 102 | Example 30 | 15.0 | 470.0 | | | | 15.0 | |
| 103 | Example 13 | 15.0 | 484.0 | | 1.0 | | | |
| 104 | Example 13 | 15.0 | 482.5 | | | | 2.5 | |
| 105 | Example 26 | 15.0 | 483.7 | | | | 1.3 | |
| 106 | Example 26 | 15.0 | 484.3 | | | | | 0.7 |
| 107 | Example 21 | 15.0 | 483.4 | | | | 1.6 | |
| 108 | Example 21 | 15.0 | 484.2 | | | | | 0.8 |
| 109 | Example 31 | 15.0 | 470.0 | | | | 15.0 | |
| 110 | Example 32 | 15.0 | 470.0 | | | | 15.0 | |
| 111 | Example 33 | 15.0 | 470.0 | | | | 15.0 | |
| 112 | Example 34 | 15.0 | 470.0 | | | | 15.0 | |
| 113 | Example 35 | 15.0 | 470.0 | | | | 15.0 | |
| 114 | Example 36 | 15.0 | 470.0 | | | | 15.0 | |

*TEA is triethanol amine
**MIA is monoisopropanol amine

EXAMPLES 115 TO 188

A 500 gram amount of each of the following identified metal working formulations was diluted with water to 3000 grams and then evaluated for lubricity according to the following procedure.

TEST PROCEDURE

A wedge-shaped high-speed steel tool is forced against the end of a rotating (88 surface feet per minute) SAE 1020 steel tube of ¼ inch wall thickness. The feed force of the tool is sufficient to cut a V-groove in the tubing wall, and the chips flow out of the cutting area in two pieces (one piece from each face of the wedge-shaped tool). The forces on the tool as a result of workpiece rotation and of tool feed are measured by a tool post dynamo-meter connected to a Sanborn recorder. Any welding of chips to tool build-up is reflected in the interruption of chip-flow (visual) and in increased resistance to workpiece rotation. The cutting test is performed with the tool-chip interface flooded throughout the operation with circulating test fluid. Tool and workpiece are in constant dynamic contact during this time, and the test is not begun until full contact is achieved all along each cutting edge. The duration of the test is three minutes.

The results obtained in accordance with the above test are given in the following table.

| Example No. | Composition of Example | Force (lbs) |
|---|---|---|
| 115 | 38 | 464 |
| 116 | 39 | 458 |
| 117 | 40 | 401 |
| 118 | 41 | 369 |
| 119 | 42 | 351 |
| 120 | 43 | 319 |
| 121 | 44 | 363 |
| 122 | 45 | 380 |
| 123 | 46 | 503 |
| 124 | 47 | 489 |
| 125 | 48 | 395 |
| 126 | 49 | 369 |
| 127 | 50 | 386 |
| 128 | 51 | 510 |
| 129 | 52 | 360 |
| 130 | 53 | 472 |
| 131 | 54 | 502 |
| 132 | 56 | 451 |
| 133 | 57 | 466 |
| 134 | 58 | 504 |
| 135 | 59 | 380 |
| 136 | 60 | 391 |
| 137 | 61 | 441 |
| 138 | 62 | 518 |
| 139 | 63 | 441 |
| 140 | 64 | 446 |
| 141 | 65 | 502 |
| 142 | 66 | 509 |
| 143 | 67 | 477 |
| 144 | 68 | 492 |
| 145 | 69 | 487 |
| 146 | 70 | 487 |
| 147 | 71 | 519 |
| 148 | 72 | 516 |
| 149 | 73 | 374 |

-continued

| Example No. | Composition of Example | Force (lbs) |
|---|---|---|
| 150 | 74 | 532 |
| 151 | 75 | 376 |
| 152 | 76 | 497 |
| 153 | 77 | 367 |
| 154 | 78 | 490 |
| 155 | 79 | 452 |
| 156 | 80 | 374 |
| 157 | 81 | 397 |
| 158 | 82 | 505 |
| 159 | 83 | 489 |
| 160 | 84 | 479 |
| 161 | 85 | 480 |
| 162 | 86 | 500 |
| 163 | 87 | 522 |
| 164 | 88 | 487 |
| 165 | 89 | 606 |
| 166 | 90 | 492 |
| 167 | 91 | 487 |
| 168 | 92 | 489 |
| 169 | 93 | 509 |
| 170 | 94 | 467 |
| 171 | 95 | 507 |
| 172 | 96 | 460 |
| 173 | 99 | 437 |
| 174 | 100 | 406 |
| 175 | 101 | 541 |
| 176 | 102 | 409 |
| 177 | 103 | 490 |
| 178 | 104 | 498 |
| 179 | 105 | 530 |
| 180 | 106 | 437 |
| 181 | 107 | 509 |
| 182 | 108 | 502 |
| 183 | 109 | 350 |
| 184 | 110 | 389 |
| 185 | 111 | 476 |
| 186 | 112 | 363 |
| 187 | 113 | 396 |
| 188 | 114 | 439 |

In the practice of this invention the alkanol amine, more especially the trialkanol amine salt of the carboxylic acid group terminated polyoxyalkylene diamine of this invention having two terminal carboxylic acid groups, wherein said diamide is the reaction product of an aliphatic dicarboxylic acid or a polymerized fatty acid having two carboxylic acid groups per molecule with a poly($C_2$ to $C_3$ oxyalkylene) homopolymer or copolymer diamine, is preferred.

While this invention has been described above with respect to various exemplary embodiments, which are intended to be non-limiting on this invention, it is recognized that those skilled in the art may practice further embodiments of this invention without departing from the spirit and scope of the invention as set forth and claimed herein.

What is claimed is:

1. A carboxylic acid group terminated polyoxyalkylene diamide and the alkali metal, ammonium or organic amine salt thereof having the following formula

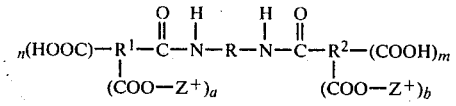

wherein

R is the divalent polyoxyalkylene chain radical residue of an amine terminated polyoxyalkylene diamine absent the terminal amine groups, $R^1$ and $R^2$ are the same or different and are selected from the group consisting of aliphatic, aromatic, cycloaliphatic, arylaliphatic, alkyl aromatic, thiodialiphatic [,] *or* halogen substituted aliphatic [or halogen substituted aromatic] radicals and having a free valence of a+n+1 and b+m+1 respectively, Z is an organic amine cation, ammonium ion or alkali metal ion, a is 0 to 3, b is 0 to 3, n is 0 to 3, m is 0 to 3, a+n is 0 to 3, b+m is 0 to 3 and a+b+m+n is 1 to 6.

2. A carboxylic acid group terminated polyoxyalkylene diamide and alkali metal, ammonium or organic amine salt thereof according to claim 1 wherein $R^1$ and $R^2$ are hydrocarbon radicals.

3. A carboxylic acid group terminated polyoxyalkylene diamide and alkali metal, ammonium or organic amine salt thereof according to claim 1 wherein $R^1$ and $R^2$ are selected from the group consisting of aliphatic, aromatic, cycloaliphatic, thiodialiphatic [,] *or* halogen substituted aliphatic [or halogen substituted aromatic] radicals.

4. A carboxylic acid group terminated polyoxyalkylene diamide and alkali metal, ammonium or organic amine salt thereof according to claim 3 wherein $R^1$ and $R^2$ are selected from the group consisting of $C_2$ to $C_{18}$ saturated or unsaturated aliphatic, $C_6$ aromatic, $C_6$ cycloaliphatic and thio di ($C_2$ to $C_3$ aliphatic) hydrocarbon radicals.

5. A carboxylic acid group terminated polyoxyalkylene diamide and alkali metal, ammonium or organic amine salt thereof according to claim 1, 2, 3 or 4 wherein R is a divalent poly(oxy $C_2$ $C_4$ alkylene) homopolymer or copolymer chain radical residue.

6. A carboxylic acid group terminated polyoxyalkylene diamide and alkali metal, ammonium or organic amine salt thereof according to claim 5 wherein R is a divalent poly(oxy $C_2$ to $C_4$ alkylene) homopolymer chain radical residue.

7. A carboxylic acid group terminated polyoxyalkylene diamide and alkali metal, ammonium or organic amine salt thereof according to claim 5 wherein R is a divalent poly(oxy $C_2$ to $C_4$ alkylene) copolymer chain radical residue.

8. The alkali metal, ammonium or organic amine salt of the carboxylic acid group terminated polyoxyalkylene diamide according to claim 5.

9. The organic amine salt of the carboxylic acid group terminated polyoxyalkylene diamide according to claim 5.

10. The salt according to claim 9 wherein the organic amine is a monoalkanol amine, dialkanol amine or trialkanol amine.

11. The salt according to claim 10 wherein the organic amine is a trialkanol amine.

12. The salt according to claim 11 wherein the trialkanol amine is a tri($C_1$ to $C_3$ alkanol) amine.

13. The carboxylic acid group terminated polyoxyalkylene diamide and the alkali metal, ammonium or organic amine salt thereof according to claim 5 wherein a+n is 1 or 2 and b+m is 1 or 2.

14. A metal working composition comprising (a) a substance selected from the group consisting of natural oil, synthetic oil and water and (b) from 0.01% to 99% by weight based on the total weight of the composition of a carboxylic acid group terminated polyoxyalkylene diamide or the alkali metal, ammonium or organic amine salt thereof according to claim 1.

15. A metal working composition comprising (a) a substance selected from the group consisting of natural oil, synthetic oil and water and (b) from 0.01% to 99% by weight based on the total weight of the composition of a carboxylic acid group terminated polyoxyalkylene diamide or the alkali metal, ammonium or organic amine salt in accordance with claim 5.

16. A metal working composition comprising (a) a substance selected from the group consisting of natural oil, synthetic oil and water and (b) from 0.01% to 99% by weight based on the total weight of the composition of a carboxylic acid terminated polyoxyalkylene diamide or the alkali metal, ammonium or organic amine salt thereof according to claim 6.

17. A metal working composition comprising (a) a substance selected from the group consisting of natural oil, [synthetic oil,] synthetic oil and water and (b) from 0.01% to 99% by weight based on the total weight of the composition of a carboxylic acid group terminated polyoxyalkylene diamide or the alkali metal, ammonium or organic amine salt thereof according to claim 7.

18. A metal working composition comprising (a) a substance selected from the group consisting of natural oil, synthetic oil and water and (b) from 0.01% to 99% by weight based on the total weight of the composition of a salt according to claim 10.

19. A metal working composition comprising (a) a substance selected from the group consisting of natural oil, synthetic oil and water and (b) from 0.01% to 99% by weight based on the total weight of the composition of a salt according to claim 12.

20. A metal working composition comprising (a) a substance selected from the group consisting of natural oil, synthetic oil and water and (b) from 0.01% to 99% by weight based on the total weight of the composition of a carboxylic acid group terminated polyoxyalkylene diamide or the alkali metal, ammonium or organic amine salt thereof according to claim 13.

21. A metal working composition according to claim 15 wherein (a) is water.

22. A metal working composition according to claim 18 wherein (a) is water.

23. A metal working composition according to claim 19 wherein (a) is water.

24. A metal working composition according to claim 20 wherein (a) is water.

25. A metal working composition according to claim 21 wherein (b) is present in an amount of from 0.01% to 25% by weight based on the total weight of the composition.

* * * * *